United States Patent [19]

Fukuda et al.

[11] Patent Number: 4,750,033

[45] Date of Patent: Jun. 7, 1988

[54] COMB FILTER, CHROMINANCE AND LUMINANCE SIGNAL SEPARATING CIRCUIT FOR MODIFYING THE LEVEL-FREQUENCY CHARACTERISTIC OF THE LUMINANCE SIGNAL

[75] Inventors: Tokuya Fukuda; Isao Masuda; Takashi Honda, all of Tokyo, Japan

[73] Assignee: Sony Corporation, Tokyo, Japan

[21] Appl. No.: 36,087

[22] Filed: Apr. 9, 1987

[30] Foreign Application Priority Data

Apr. 18, 1986 [JP] Japan .................................. 61-89748

[51] Int. Cl.[4] ............................................. H04N 9/78
[52] U.S. Cl. .......................................... 358/31; 358/37
[58] Field of Search ................................. 358/31, 37

[56] References Cited

U.S. PATENT DOCUMENTS

| 4,096,516 | 6/1978 | Pritchard | 358/31 |
| 4,245,238 | 1/1981 | Fuhrer | 358/37 |
| 4,355,333 | 10/1982 | Sato | 358/31 |
| 4,365,266 | 12/1982 | Lagoni | 358/31 |

FOREIGN PATENT DOCUMENTS 95788   6/1982   Japan .................................. 358/31

Primary Examiner—John W. Shepperd
Attorney, Agent, or Firm—Philip M. Shaw, Jr.

[57] ABSTRACT

A color video signal processing circuit comprising an input terminal through which a color video signal including chrominance and luminance signals is supplied, a signal separating portion which includes both a subtraction-type comb-filter by which a first signal is derived from the color video signal and an addition-type comb-filter by which a second signal is derived from the color video signal, a level modifying portion for emphasizing the level of a first segment of the first signal residing in a predetermined frequency band lower than the frequency band of the chrominance signal and attenuating the level of a second segment of the first signal residing in the frequency band of the chrominance signal, an adder for adding an output of the level modifying portion to the second signal, a first output portion connected to the signal separating portion, and a second output portion connected to the adder. The chrominance signal separated from the color video signal is obtained through the first output portion and the luminance signal separated from the color video signal and modified to have a predetermined level-frequency characteristic is obtained through the second output portion.

7 Claims, 1 Drawing Sheet

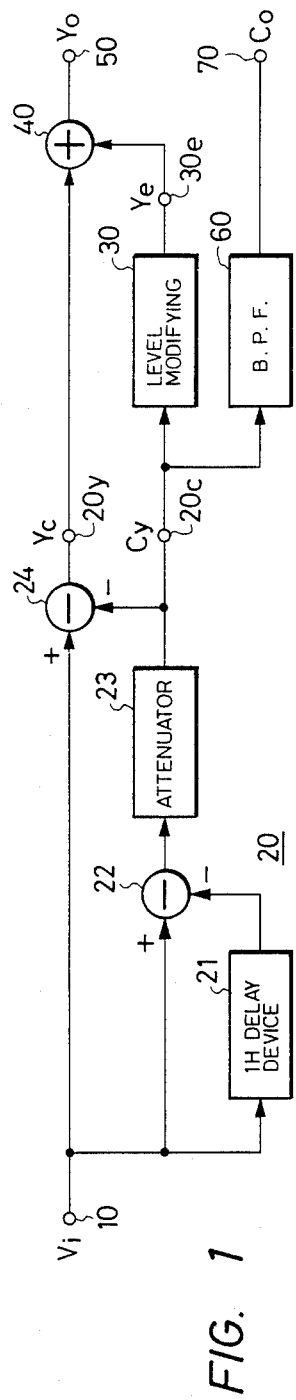
FIG. 1
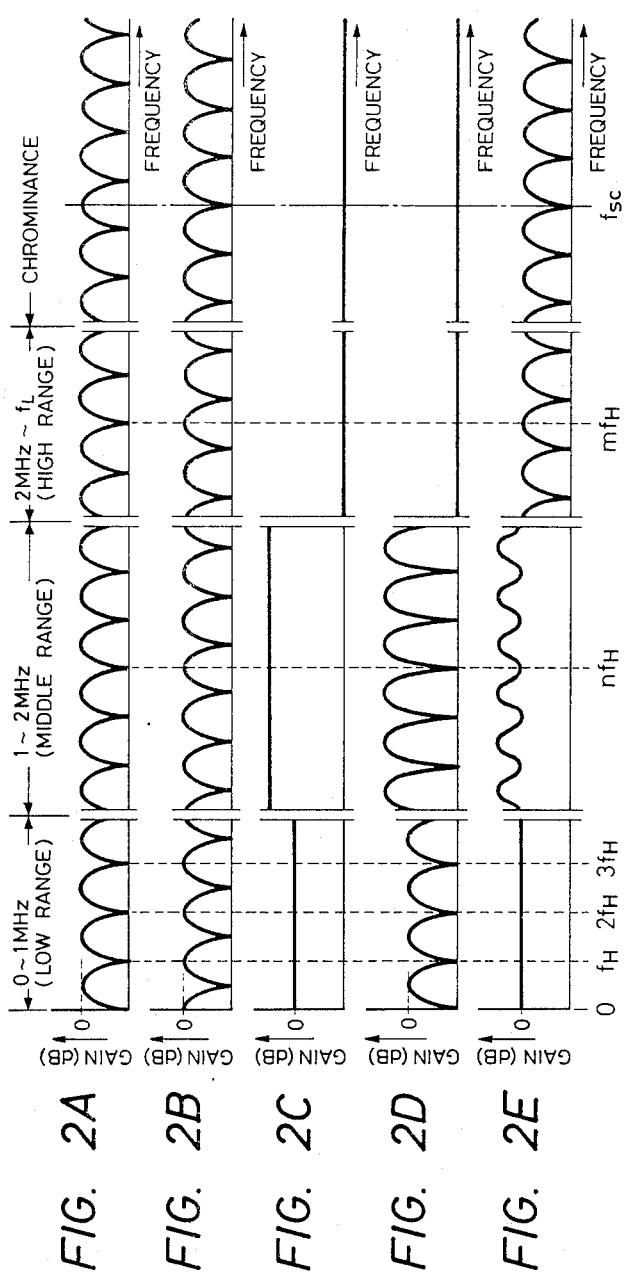
FIG. 2A
FIG. 2B
FIG. 2C
FIG. 2D
FIG. 2E

COMB FILTER, CHROMINANCE AND LUMINANCE SIGNAL SEPARATING CIRCUIT FOR MODIFYING THE LEVEL-FREQUENCY CHARACTERISTIC OF THE LUMINANCE SIGNAL

BACKGROUND OF THE INVENTION

1. Field of the Invention

The present invention relates generally to color video signal processing circuits, and more particularly, is directed to a circuit for obtaining individually a chrominance signal which is separated from a color video signal and a luminance signal which is separated also from the color video signal and modified to have a predetermined level-frequency characteristic.

2. Description of the Prior Art

In a recording circuit arrangement employed in a video tape recorder (VTR), luminance and chrominance signals are separated respectively from a color video signal which is supplied, for example, through a color television broadcast. The separated luminance signal is used for frequency-modulating an appropriate carrier to produce a frequency-modulated luminance signal. The separated chrominance signal is frequency-converted to have a frequency band lower than the frequency band of the frequency-modulated luminance signal. Then, the frequency-modulated luminance signal and the frequency-converted chrominance signal are mixed or combined to form a composite video signal which is supplied to a rotary magnetic head device to be recorded on a magnetic tape.

For each of such separations of the chrominance and luminance signals from the color video signal, a so-called comb-filter is ordinarily used. In the case where a color video signal according to the NTSC system is processed, a subtraction-type comb-filter which includes a delay device providing a signal delay of one horizontal period (hereinafter, referred to as a 1H delay device) is used for separating the chrominance signal from the color video signal. An addition-type comb-filter which also includes the 1H delay device is used for separating the luminance signal from the color video signal. To obtain the chrominance signal components contained in the color video signal, the subtraction-type comb-filter is formed to have a toothed band pass characteristic which provides a minimum gain for signal components residing in a frequency band lower than the frequency band of the chrominance signal in the color video signal, a depression falling into a minimum gain at each frequency represented by $N \times f_H$, where $N$ is a positive integer and $f_H$ is a horizontal frequency, and a peak reaching to a gain of zero decibels (hereinafter, referred to as 0 dB) at each frequency represented by $(N + \frac{1}{2}) \times f_H$ for signal components residing in the frequency band of the chrominance signal components in the color video signal.

To obtain the luminance signal contained in the color video signal, the addition-type comb-filter is formed to have another toothed band pass characteristic which provides a gain of 0 dB for the signal components residing in a frequency band lower than the frequency band of the chrominance signal in the color video signal, a peak reaching to a gain of 0 dB at each frequency represented by $N \times f_H$ and a depression falling into a minimum gain at each frequency represented by $(N + \frac{1}{2}) \times f_H$ for the signal components residing in a frequency band of the chrominance signal in the color video signal.

In a reproducing circuit arrangement of the video tape recorder, the frequency-modulated luminance signal and the frequency-converted chrominance signal are separated through a high pass filter and a low pass filter respectively from the composite video signal which is reproduced by the rotary magnetic head device from the magnetic tape. Then, a reproduced luminance signal is obtained by frequency-demodulating the frequency-modulated luminance signal separated from the reproduced composite video signal and a reproduced chrominance signal is obtained by frequency-converting the frequency-converted chrominance signal separated from the reproduced composite video signal to cause the same to reside in its original frequency band. The reproduced luminance and chrominance signals are combined with each other to be derived from an output terminal as a reproduced color video signal.

The reproduced color video signal thus obtained from the video tape recorder is supplied to, for example, a color video monitor having an image display device such as a color cathode ray tube. In the color video monitor, chrominance and luminance signals are separated from the reproduced color video signal respectively through subtraction-type and addition-type comb-filters having their respective toothed band pass characteristics similar to those described above. That is, in the event of a color video monitor for an NTSC system color video signal, a subtraction-type comb-filter which includes a 1H delay device and a toothed band pass characteristic which provides a depression falling into a minimum gain at each frequency represented by $N \times f_H$ and a peak reaching to a gain of 0 dB at each frequency represented by $(N + \frac{1}{2}) \times f_H$ for the reproduced color video signal, is used for separating the chrominance signal from the reproduced color video signal. An addition-type comb-filter which includes the 1H delay device and a toothed band pass characteristic which provides a peak reaching to a gain of 0 dB at each frequency represented by $N \times f_H$ and a depression falling into a minimum gain at each frequency represented by $(N + \frac{1}{2}) \times f_H$ for the reproduced color video signal, is used for separating the luminance signal from the reproduced color video signal.

Assume the case where the luminance signal is obtained through the addition-type comb-filter provided in the recording circuit arrangement of a video tape recorder. The comb-filter has a toothed band pass characteristic which provides a constant gain of 0 dB for the signal components residing in a frequency band lower than the frequency band of the chrominance signal in the color video signal, as described above, and therefore has a constant level in a frequency band lower than the frequency band of the chrominance signal. When such a luminance signal is contained in the reproduced color video signal which is supplied to the color video monitor, there is the problem that the luminance signal separated from the reproduced color video signal through the addition-type comb-filter provided in the color video monitor has signal components of frequencies coinciding with each frequency represented by $(N + \frac{1}{2}) \times f_H$ and their vicinities which are considerably attenuated compared with other signal components thereof. Such attenuated signal components of the luminance signal separated from the reproduced color video signal give rise to a deterioration in the quality of the reproduced picture which is obtained by the color video monitor based on the luminance and chrominance signals separated from the reproduced color video signal.

For compensating for the attenuation of the luminance signal brought about in the color video monitor as mentioned above, the luminance signal should preferably contain signal components which are of frequencies between each successive two of the frequencies represented by $N \times f_H$ and which are emphasized in level within a predetermined frequency band. A level control circuit can be used for emphasizing the levels of selected signal components of the luminance signal separated from the color video signal in the recording circuit arrangement of the video tape recorder. However, when a level control circuit is provided in addition to the comb-filter and the level control circuit contains a 1H delay device which is in addition to the 1H delay device contained in the comb-filter, the configuration of the recording circuit arrangement of the video tape recorder is made complicated and the production cost of the video tape recorder is undesirably increased.

OBJECTS AND SUMMARY OF THE INVENTION

Accordingly, it is an object of the present invention to provide a color video signal processing circuit suitable for use in a video tape recorder, which avoids the aforementioned problems encountered with the prior art.

More particularly, it is an object of the present invention to provide a color video signal processing circuit operative to separate chrominance and luminance signals from a color video signal, which is relatively simple in construction without any particular delay device other than a delay device used for signal separation, and by which the chrominance signal is separated individually from the color video signal and the luminance signal is also separated individually from the color video signal and modified to have a predetermined level-frequency characteristic.

Another object of the present invention is to provide a color video signal processing circuit for separating a chrominance and luminance signals from a color video signal, which is relatively simple in construction and without any particular delay device other than a delay device used for signal separation. A luminance signal containing signal components which are of frequencies between each successive two of the frequencies represented by $N \times f_H$ and emphasized in level within a predetermined frequency band must be obtainable as the luminance signal separated from the color video signal together with the chrominance signal also separated from the color video signal.

According to the present invention, there is provided a color video signal processing circuit for separating chrominance and luminance signals from a color video signal, the circuit comprising: an input terminal for receiving the color video signal, signal separating means, including first and second intermediate terminals, delay means for delaying the color video signal supplied through said input terminal by at least substantially one horizontal period, a subtraction-type comb-filter, including said delay device, connected between said input terminal and said first intermediate terminal, and an addition-type comb-filter, also including said delay device, connected between said input terminal and said second intermediate terminal, whereby a signal Cy containing the chrominance signal as a major component and the luminance signal as a minor component is generated at said first intermediate terminal and a signal Yc containing the luminance signals a major component and the chrominance signal as a minor component is generated at said second intermediate terminal. Further included are level modifying means connected to said first intermediate terminal for outputting a signal which emphasizes the level of a first segment of the Cy signal residing in a predetermined frequency band lower than the frequency band of the chrominance signal and attenuating the level of a second segment of the Cy signal residing in the frequency band of the chrominance signal, adding means for adding the output of said level modifying means to said Yc signal obtained at said second intermediate terminal and outputting the result, first output means for deriving a separated chrominance signal from said first intermediate terminal, and second output means for deriving a separated luminance signal from said adding means.

In the circuit thus constituted in accordance with the present invention, a first partial circuit arrangement is connected between the input terminal and the first intermediate terminal and has a first toothed band pass characteristic which provides a depression falling into a minimum gain at each frequency represented by $N \times f_H$ and a peak reaching to a gain of 0 dB at each frequency represented by $(N+\frac{1}{2}) \times f_H$ or $(N+\frac{1}{4}) \times f_H$ for the color video signal supplied through the input terminal. A second partial circuit arrangement is connected between the input terminal and the second intermediate terminal and has a second toothed band pass characteristic which provides a peak reaching to a gain of 0 dB at each frequency represented by $N \times f_H$ and a depression falling into a minimum gain at each frequency represented by $(N+\frac{1}{2}) \times f_H$ or $(N+\frac{1}{4}) \times f_H$ for the color video signal supplied through the input terminal. Further, a third partial circuit arrangement is connected between the input terminal and the output end of the level modifying portion and has a third toothed band pass characteristic which provides a depression falling into a minimum gain at each frequency represented by $N \times f_H$ and a peak reaching to a gain more than 0 dB at each frequency represented by $(N+\frac{1}{2}) \times f_H$ or $(N+\frac{1}{4}) \times f_H$ for signal components of the color video signal residing in a predetermined frequency band lower than the frequency band of the chrominance signal. A fourth partial circuit arrangement is connected between the input terminal and the output end of the adding portion and has a fourth toothed band pass characteristic which provides a depression falling into a gain of 0 dB at each frequency represented by $N \times f_H$ and a peak reaching to a gain more than 0 dB at each frequency represented by $(N+\frac{1}{2}) \times f_H$ or $(N+\frac{1}{4}) \times f_H$ for the signal components of the color video signal residing in a predetermined frequency band lower than the frequency band of the chrominance signal. The "N" is a positive integer in each case above.

With these first to fourth partial circuit arrangements having the above-described first to fourth toothed band pass characteristics, respectively, the separated chrominance signal and the separated luminance signal containing its signal components which are of frequencies between each successive two of the frequencies represented by $N \times f_H$ and which are emphasized in level within a predetermined frequency band lower than the frequency band of the chrominance signal in the color video signal are obtained through the first output portion and the second output portion, respectively, using a relatively simple circuit configuration without any particular delay device other than the delay device used in common for forming the subtraction-type and addition-type comb-filters.

The above, and other objects, features and advantages of the present invention will become apparent from the following detailed description which is to be read in conjunction with the accompanying drawings.

BRIEF DESCRIPTION OF THE DRAWINGS

FIG. 1 is a block diagram showing one embodiment of color video signal processing circuit according to the present invention; and FIGS. 2A to 2E are diagrams showing the frequency characteristics of the partial circuit arrangements in the embodiment shown in FIG. 1.

DESCRIPTION OF THE PREFERRED EMBODIMENT

FIG. 1 shows an embodiment of color video signal processing circuit according to the present invention, which is operative to separate chrominance and luminance signals individually from a color video signal generated in accordance with the NTSC system.

Referring to FIG. 1, an input color video signal Vi, including chrominance and luminance signals according to the NTSC system, is supplied through an input terminal 10 to a signal separating portion 20 containing a 1H delay device 21 which delays the input color video signal Vi by one horizontal line period. The signal separating portion 20 is constituted to form both a subtraction-type comb-filter, including the 1H delay device 21, between the input terminal 10 and a first intermediate terminal 20c and an addition-type comb filter, including also the 1H delay device 21, between the input terminal 10 and a second intermediate terminal 20y. That is, in the signal separating portion 20, the input color video signal Vi is supplied directly to the (+) input of a first subtracter 22 and through the 1H delay device 21 to the (−) input of the first subtracter 22. The output of the first subtracter 22 is supplied to an attenuator 23 where it is attenuated in level by a factor of one half. The output of the attenuator 23 is supplied to the first intermediate terminal 20c and also supplied to the (−) input of a second subtracter 24 having its (+) input supplied directly with the input color video signal Vi. The output of the second subtracter 24 is supplied to the second intermediate terminal 20y.

The circuit arrangement in the signal separating portion 20 connected between the input terminal 10 and the first intermediate terminal 20c has the toothed band pass characteristic shown in FIG. 2A where fsc indicates the color subcarrier frequency and n and m are positive integers respectively. This toothed band pass characteristic provides a depression falling into a minimum gain at each frequency represented by $N \times f_H$ and a peak reaching to a gain of 0 dB at each frequency represented by $(N+\frac{1}{2}) \times f_H$ for the input color video signal Vi. The circuit arrangement in the signal separating portion 20 connected between the input terminal 10 and the second intermediate terminal 20y has the toothed band pass characteristic shown in FIG. 2B which provides a peak reaching to a gain of 0 dB at each frequency represented by $N \times f_H$ and a depression falling into a minimum gain at each frequency represented by $(N+\frac{1}{2}) \times f_H$ for the input color video signal Vi.

Consequently, a signal Cy containing the chrominance signal as a major component and the luminance signal included as a minor component in the chrominance signal is obtained at the first intermediate terminal 20c, and another signal Yc containing the luminance signal as a major component and the chrominance signal included as a minor component in the luminance signal is obtained at the second intermediate terminal 20y. The luminance signal contained in the signal Yc has signal components which are of frequencies between each successive two of the frequencies represented by $(N+\frac{1}{2}) \times f_H$ and they are considerably attenuated compared with other signal components thereof.

In this embodiment, the frequency band below the frequency band of the chrominance signal in the input color video signal Vi is divided into a low range of 0 Hz to 1 MHz, a middle range of 1 MHz to 2 MHz, including a frequency $nf_H$ at the central portion thereof, and a high rang of 2 MHz to the lowest frequency $f_L$ in the frequency band of the chrominance signal, including a frequency $mf_H$ at the central portion of this high range. It is desired to obtain a luminance signal, separated from the input color video signal Vi, which contains signal components which are of the frequencies between each successive two of the frequencies represented by $N \times f_H$ and which are emphasized in level within the middle range of 1 MHz to 2 MHz.

A level modifying portion 30 is connected to the first intermediate terminal 20c and receives the signal Cy obtained therefrom. The level modifying portion 30 has a frequency characteristic as shown in FIG. 2C which provides a gain of 0 dB for signal components of the signal Cy residing in the low range of 0 Hz to 1 MHz, a gain of more than 0 dB for signal components of the signal Cy residing in the middle range of 1 MHz to 2 MHz, and a minimum gain for signal components of the signal Cy residing in the high range of 2 MHz to the lowest frequency $f_L$ in the frequency band of the chrominance signal. Such a level modifying portion 30 may comprise a low pass filter which has a cut-off frequency of 2 MHz and is modified to provide an increased gain for the signal components of the signal Cy residing in the middle range of 1 MHz to 2 MHz.

Accordingly, the circuit arrangement provided between the input terminal 10 and an output end 30e of the level modifying portion 30 has a toothed band pass characteristic as shown in FIG. 2D which provides a depression falling into a minimum gain at each frequency represented by $N \times f_H$ and a peak reaching to a gain of 0 dB at each frequency represented by $(N+\frac{1}{2}) \times f_H$ for the signal components of the signal Cy residing in the low range of 0 Hz to 1 MHz, a depression falling into a minimum gain at each frequency represented by $N \times f_H$ and a peak reaching to a gain of more than 0 dB at each frequency represented by $(N+\frac{1}{2}) \times f_H$ for the signal components of the signal Cy residing in the middle range of 1 Hz to 2 MHz, and a minimum gain for the signal components of the signal Cy residing in the high range of 2 MHz to the lowest frequency $f_L$ in the frequency band of the chrominance signal. Thus a narrow-band luminance signal Ye which includes first signal components thereof residing in the middle range of 1 Hz to 2 MHz and second signal components thereof residing in the middle range of 1 Hz to 2 MHz and emphasized compared with the first signal components is obtained at the output end 30e of the level modifying portion 30.

The narrow-band luminance signal Ye is added by an adder 40 to the signal Yc obtained from the second intermediate terminal 20y and a separated luminance signal Yo is supplied from the adder 40 to a luminance signal output terminal 50.

As a result of the above described construction, a the circuit arrangement provided between the input terminal 10 and the luminance signal output terminal 50 has a toothed band pass characteristic as shown in FIG. 2E which provides a constant gain of 0 dB for signal components of the input color video signal Vi residing in the low range of 0 Hz to 1 MHz, a depression falling into a gain of 0 dB at each frequency represented by $N \times f_H$ and a peak reaching to a gain of more than 0 dB at each frequency represented by $(N+\frac{1}{2}) \times f_H$ for signal components of the input color video signal Vi residing in the middle range of 1 Hz to 2 MHz, and a peak reaching to a gain of 0 dB at each frequency represented by $N \times f_H$ and a depression falling into a minimum gain at each frequency represented by $(N+\frac{1}{2}) \times f_H$ for signal components of the input color video signal Vi residing in the high range of 2 MHz to the lowest frequency $f_L$ in the frequency band of the chrominance signal. Therefore, the separated luminance signal Yo obtained at the luminance signal output terminal 50 has signal components which are of the frequencies between each successive two of the frequencies represented by $N \times f_H$ and emphasized in level within the middle range of 1 MHz to 2 MHz.

The signal Cy obtained at the first intermediate terminal 20c is supplied to a band pass filter (B.P.F) 60 which has a pass band coinciding substantially with the frequency band of the chrominance signal in the input color video signal Vi and a separated chrominance signal Co is outputted from the band pass filter 60 to a chrominance signal output terminal 70.

Accordingly, the circuit arrangement provided between the input terminal 10 and the chrominance signal output terminal 70 has a toothed band pass characteristic which provides a minimum gain for signal components of the input color video signal Vi residing in a frequency band lower than the frequency band of the chrominance signal in the input color video signal Vi, and a depression falling into a minimum gain at each frequency represented by $N \times f_H$ and a peak reaching to a gain of 0 dB at each frequency represented by $(N+\frac{1}{2}) \times f_H$ for signal components of the input color video signal Vi residing in the frequency band of the chrominance signal.

Although the separated chrominance and luminance signals Co and Yo are obtained from the color video signal according to the NTSC system in the above described embodiment and therefore a 1H delay device 21 is used for the signal separating portion 20, it is to be understood that a 2H delay device which provides a signal delay of two horizontal periods may be used for the signal separating portion 20 in place of the 1H delay device 21 so as to allow the circuit according to the present invention to be applied for separating chrominance and luminance signals individually from a color video signal according to the PAL system. In such event, the circuit arrangement in the signal separating portion 20 provided between the input terminal 10 and the first intermediate terminal 20c has a toothed band pass characteristic which provides a depression falling into a minimum gain at each frequency represented by $N \times f_H$ and a peak reaching to a gain of 0 dB at each frequency represented by $(N+\frac{1}{2}) \times f_H$ for the color video signal according to the PAL system, and the circuit arrangement in the signal separating portion 20 provided between the input terminal 10 and the second intermediate terminal 20y has another toothed band pass characteristic which provides a peak reaching to a gain of 0 dB at each frequency represented by $N \times f_H$ and a depression falling into a minimum gain at each frequency represented by $(N+\frac{1}{2}) \times f_H$ for the color video signal according to the PAL system.

Although the present invention has been shown and described with respect to preferred embodiments, various changes and modifications which are obvious to a person skilled in the art to which the invention pertains are deemed to lie within the spirit and scope of the invention.

What is claimed is:

1. A color video signal processing circuit for separating chrominance and luminance signals from a color video signal, the circuit comprising;
   an input terminal through which the color video signal is supplied,
   signal separating means containing a delay device for delyaing the color video signal suppplied through said input terminal by at least substantially one horizontal period so as to form a substraction-type comb-filter including said delay device between said input terminal and a frist intermediate terminal and an addition-type combfilter including also said delay device between said input terminal and a second intermediate terminal,
   level modifying means connected to said first intermediate terminal for providing a gain of zero decibels for first signal components of the signal at said first intermediate terminal residing in a low range in the frequency band which is lower than the frequency band of the chrominance signal, a gain of more than zero decibels for second signal components of the signal at said first intermediate terminal residing in a middle range in the frequency band which is lower than the frequency band of the chrominance signal, and a minimum gain for third signal components of the signal at said first intermediate terminal residing in a high range in the frequency band which is lower than the frequency band of the chrominance signal and a frequency range higher than said high range,
   adding means for adding an output of said level modifying means to a signal obtained at said second intermediate terminal,
   first output means for deriving a separated chrominance signal from said first intermediate terminal, and
   second output means for deriving a separated luminance signal from said adding means.

2. A color video signal processing circuit according to claim 1, wherein said signal separating means comprises a delay device having an input, which is connected to said input terminal, and an output, a first subtracter having a (+) input connected to said input terminal, a (−) input connected to the output of said delay device, and an output, an attenuator having an input connected to the output of said subtracter and an output connected to said first intermediate terminal, and a second subtracter having a (+) input connected to said input terminal, a (−) input connected to the output of said attenuator, and an output connected to said second intermediate terminal.

3. A color video signal processing circuit according to claim 1, wherein said first output means comprises a first output terminal and a band pass filter connected between said first intermediate terminal and said first output terminal.

4. A color video signal processing circuit according to claim 3, wherein said second output means comprises a second output terminal connected to said adding means.

5. A color video signal processing circuit according to claim 1, wherein said color video signal supplied through said input terminal is a color video signal according to the NTSC system, and said delay means is operative to delay said color video signal by one horizontal period.

6. A color video signal processing circuit according to claim 1, wherein said color video signal supplied through said input terminal is a color video signal according to the PAL system, and said delay means is operative to delay said color video signal by two horizontal periods.

7. A color video signal processing circuit according to claim 1, wherein said low range is lower than approximately one megahertz, said middle range is between approximately one megahertz and two megahertz, and said high range is higher than approximately two megahertz.

* * * * *